Figure 1:
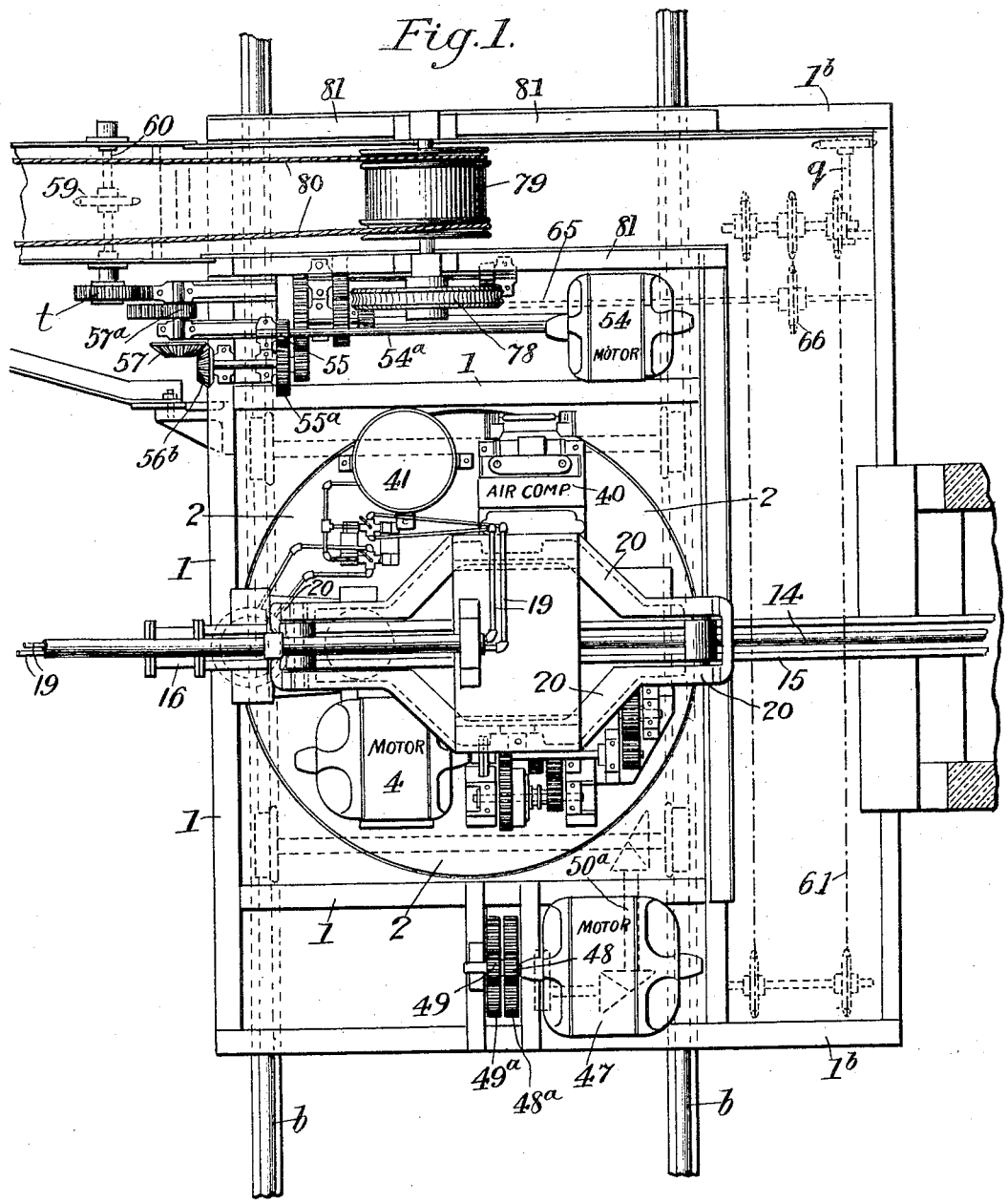

No. 893,453.　　　　　　　　　　　　　　　PATENTED JULY 14, 1908.
F. H. DANIELS, A. F. BACKLIN & I. EKLUND.
COKE DRAWING APPARATUS.
APPLICATION FILED NOV. 16, 1904.

11 SHEETS—SHEET 1.

Witnesses:
D. W. Edlin.
C. J. O'Neill

Inventors.
F. H. Daniels,
A. F. Backlin
Idoff Eklund
By their attorneys
Rennie & Goldsborough No. 893,453. PATENTED JULY 14, 1908.
F. H. DANIELS, A. F. BACKLIN & I. EKLUND.
COKE DRAWING APPARATUS.
APPLICATION FILED NOV. 16, 1904.
11 SHEETS—SHEET 2.
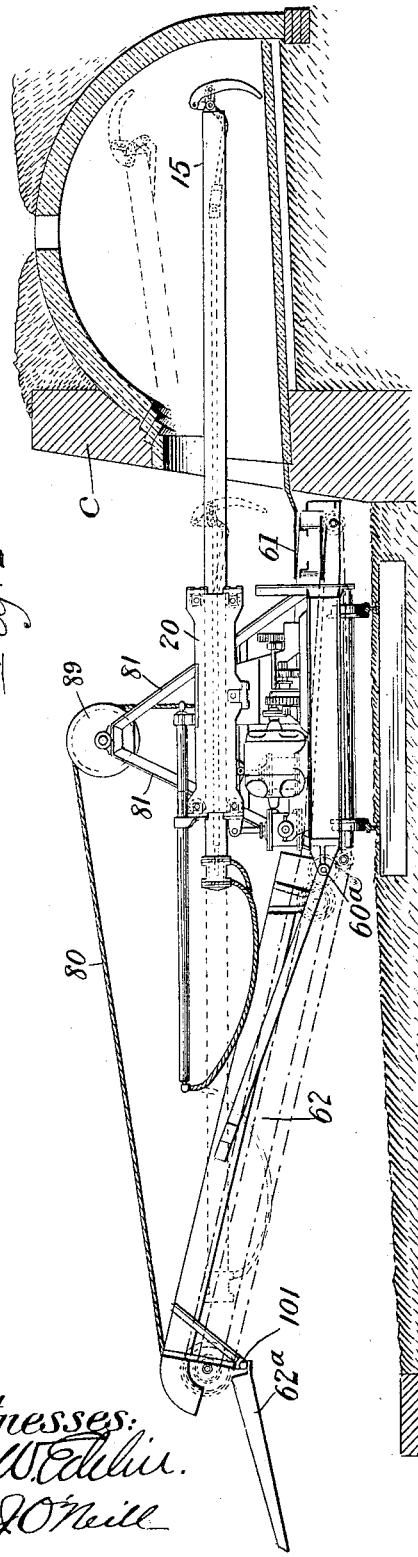
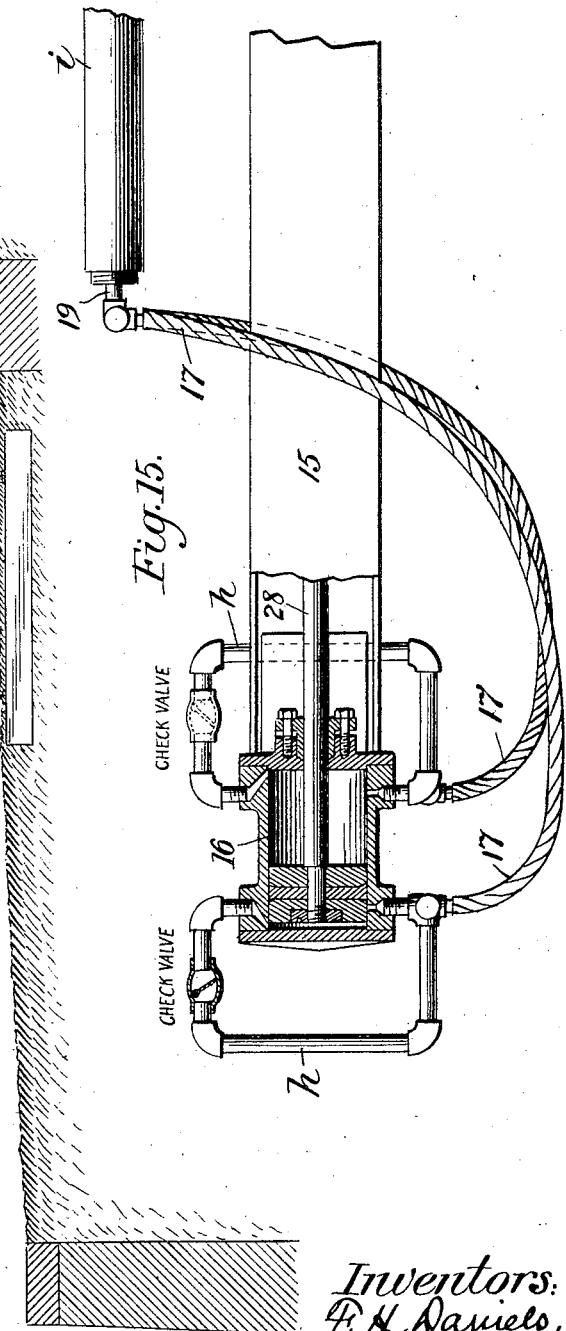
Witnesses:
Inventors:

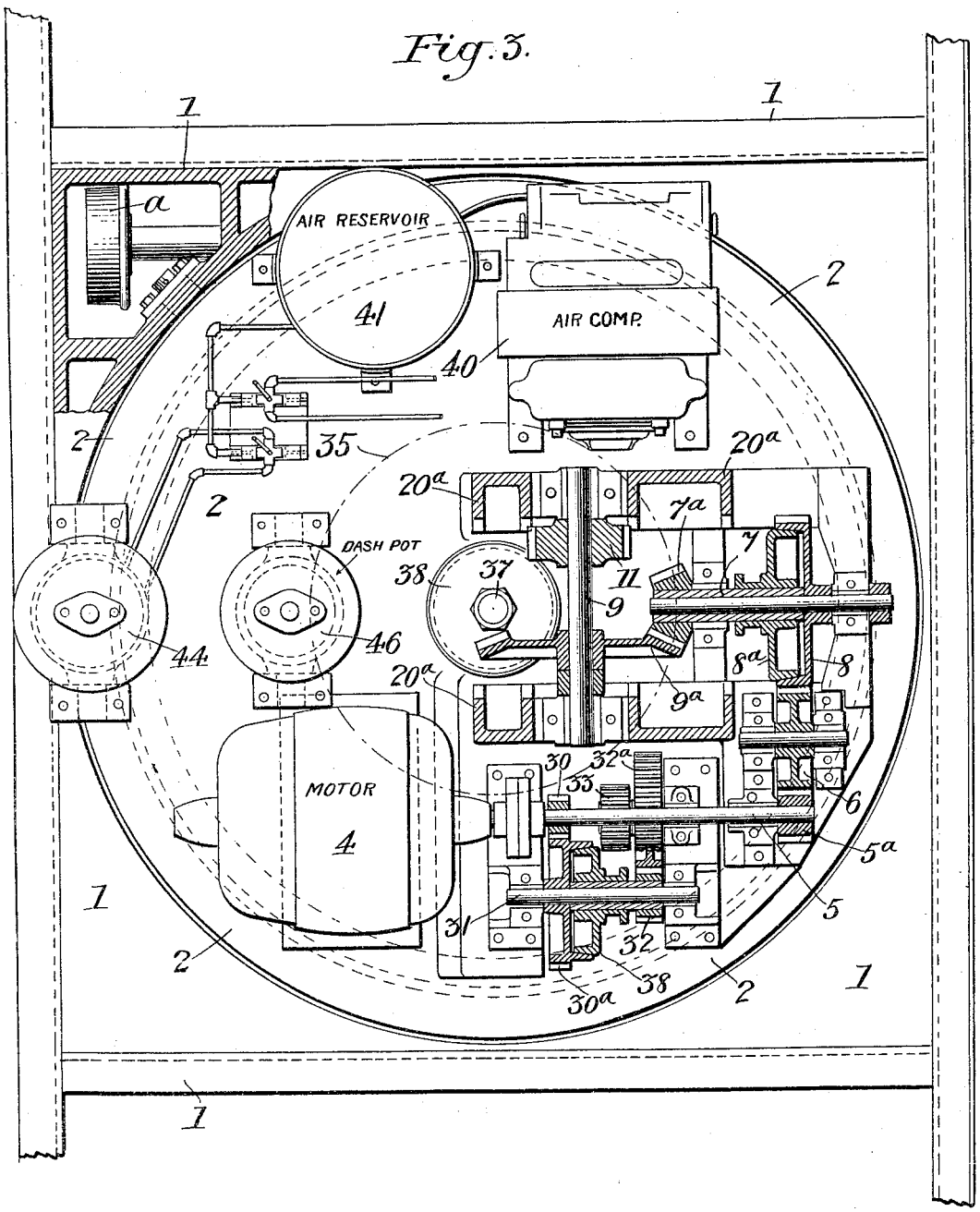

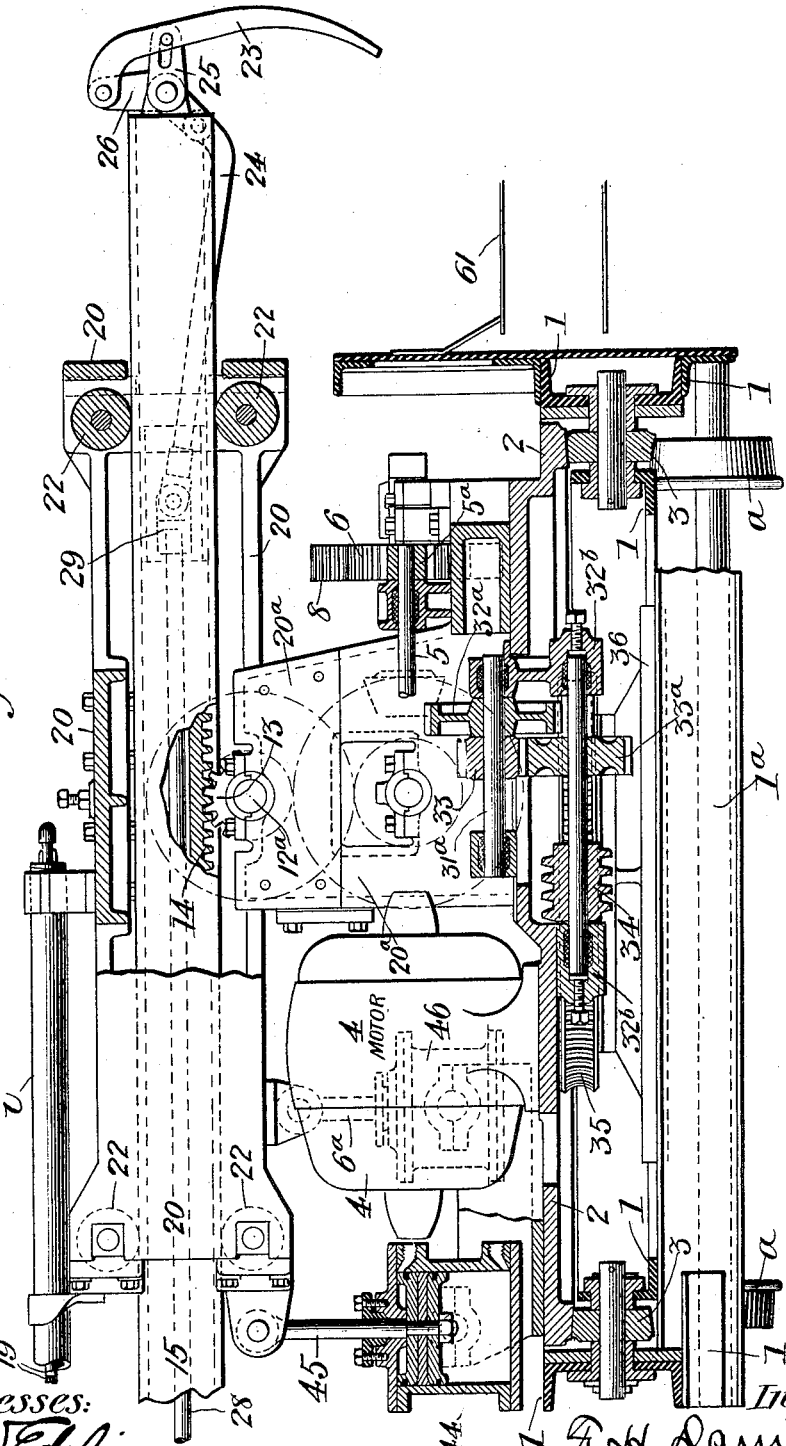

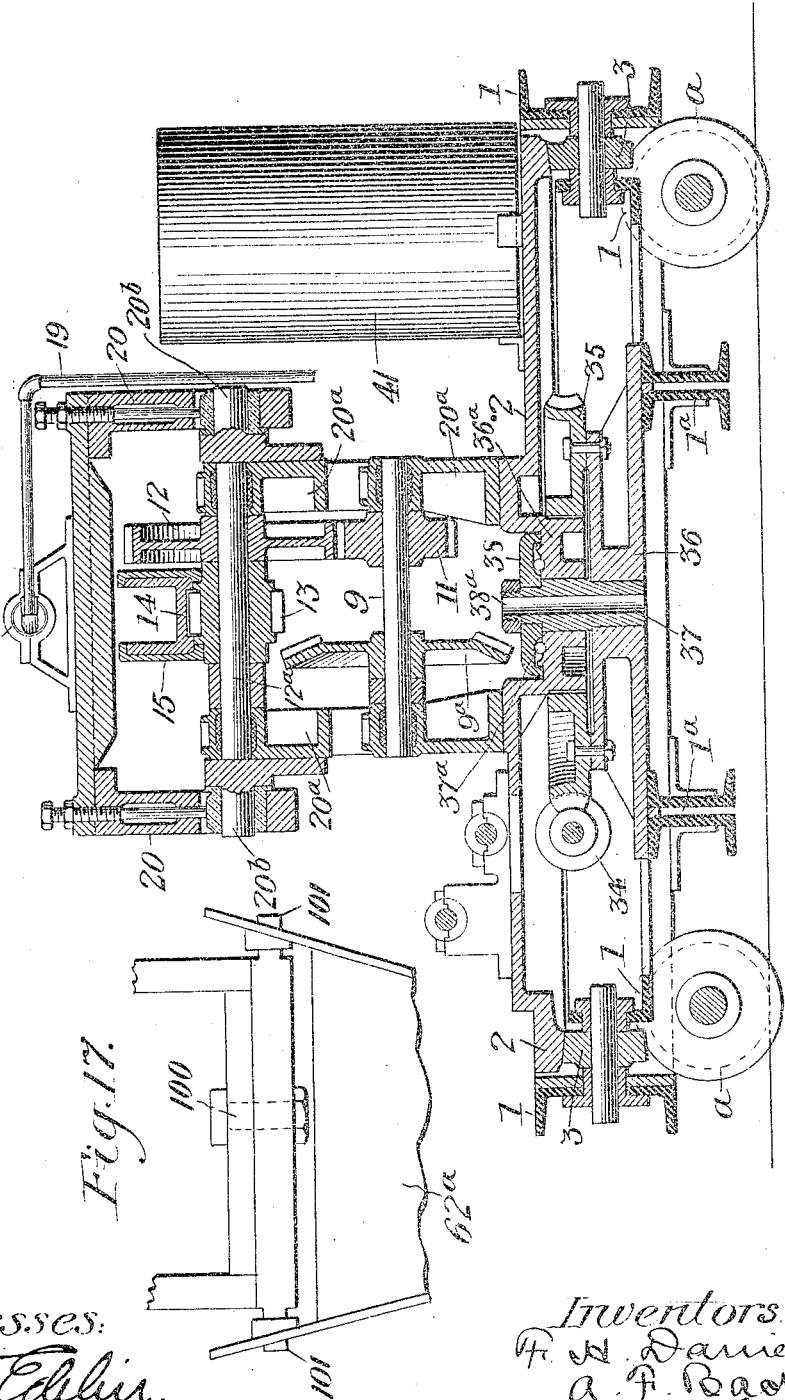

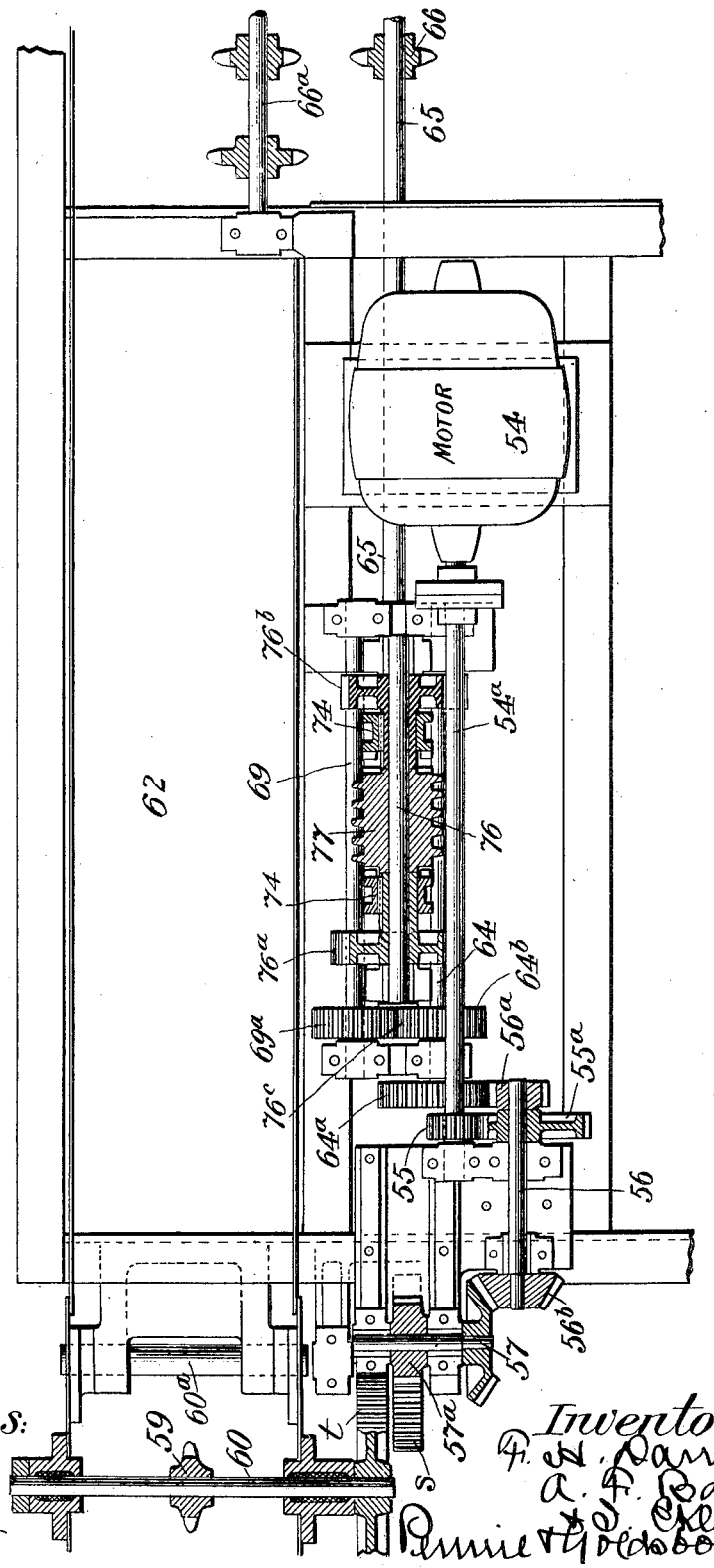

No. 893,453. PATENTED JULY 14, 1908.
F. H. DANIELS, A. F. BACKLIN & I. EKLUND.
COKE DRAWING APPARATUS.
APPLICATION FILED NOV. 16, 1904.
11 SHEETS—SHEET 7.
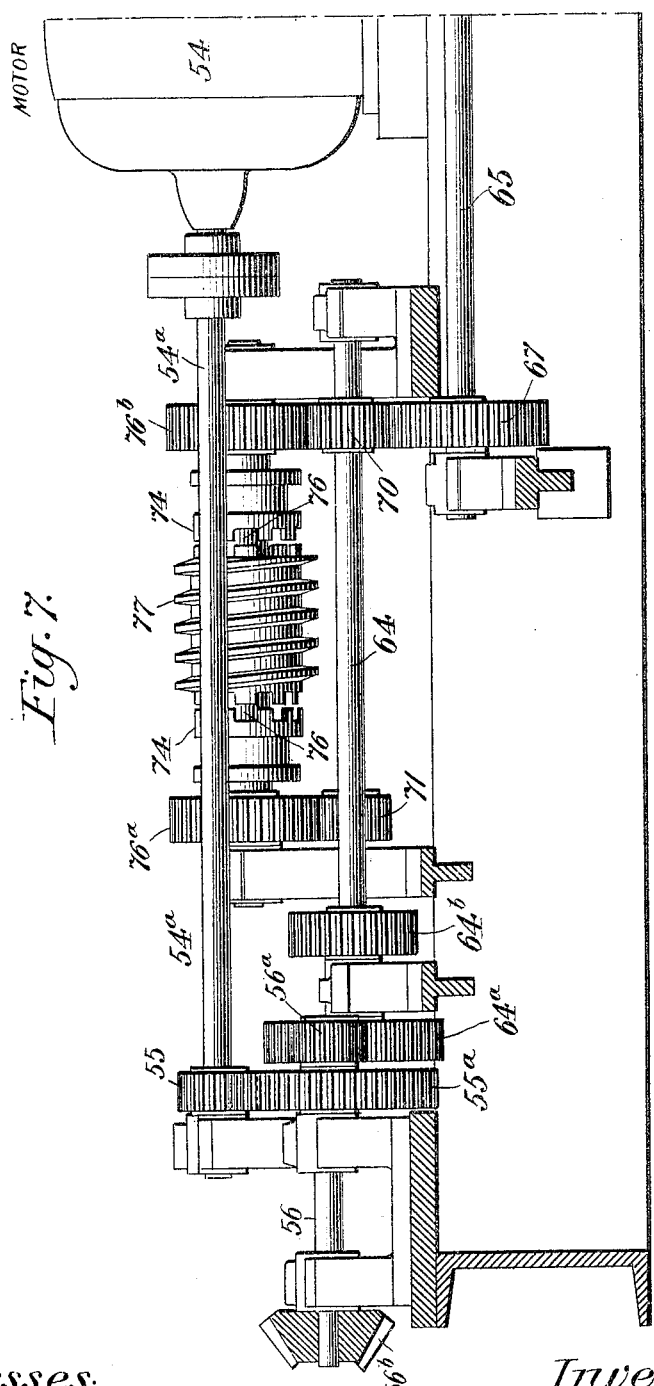

No. 893,453. PATENTED JULY 14, 1908.
F. H. DANIELS, A. F. BACKLIN & I. EKLUND.
COKE DRAWING APPARATUS.
APPLICATION FILED NOV. 16, 1904.
11 SHEETS—SHEET 8.
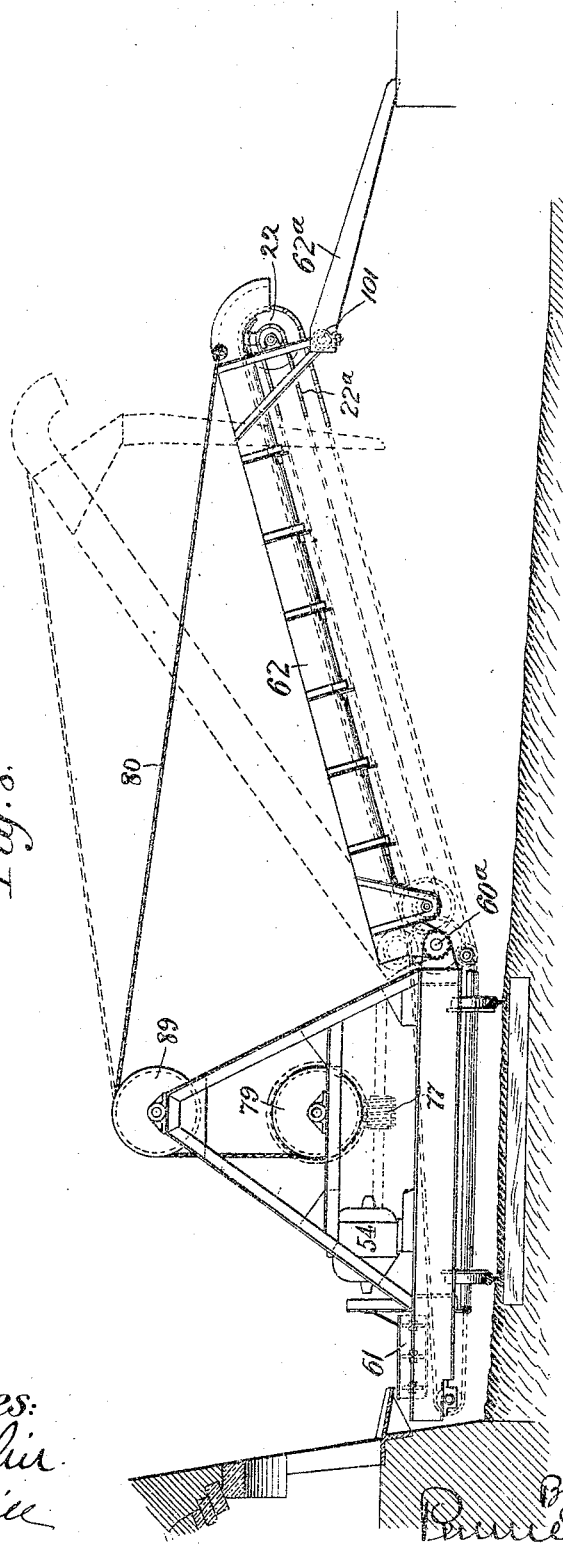
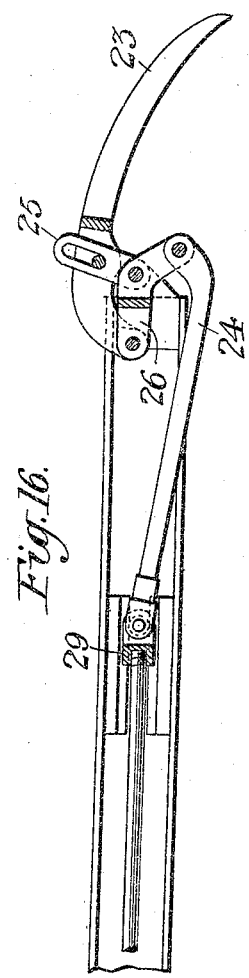
Witnesses:
Inventors No. 893,453. PATENTED JULY 14, 1908.
F. H. DANIELS, A. F. BACKLIN & I. EKLUND.
COKE DRAWING APPARATUS.
APPLICATION FILED NOV. 16, 1904.
11 SHEETS—SHEET 6.
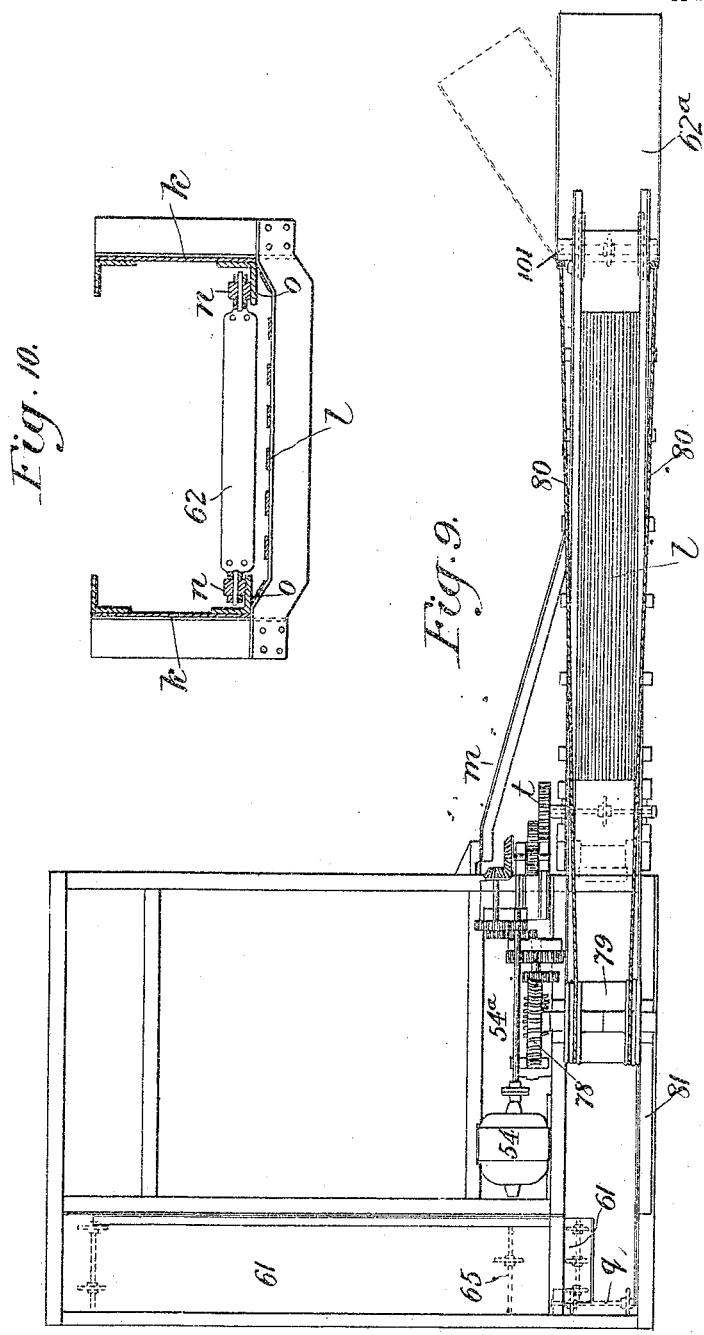
Witnesses:
Inventors.

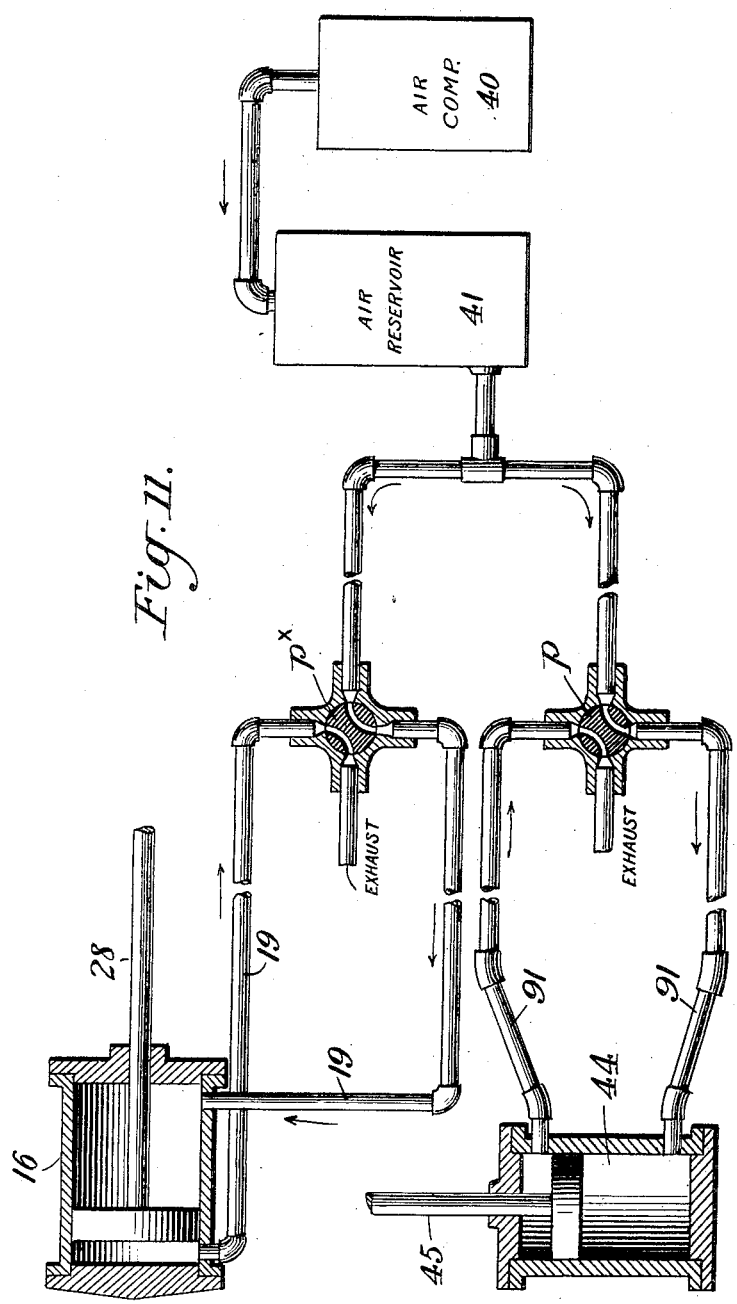

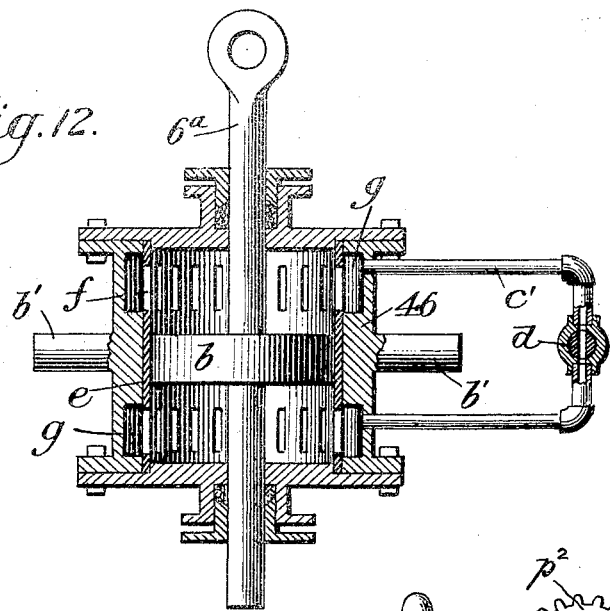
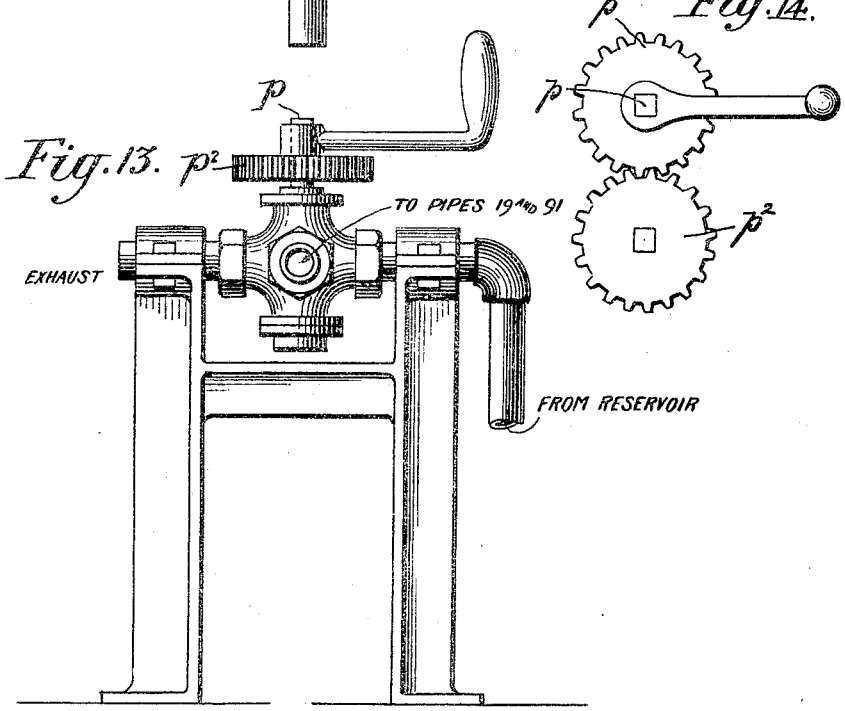

UNITED STATES PATENT OFFICE.

FRED H. DANIELS, AXEL F. BACKLIN, AND IDOFF EKLUND, OF WORCESTER, MASSACHUSETTS, ASSIGNORS TO H. C. FRICK COKE COMPANY, OF PITTSBURG, PENNSYLVANIA, A CORPORATION OF PENNSYLVANIA.

COKE-DRAWING APPARATUS.

No. 893,453.     Specification of Letters Patent.     Patented July 14, 1908.

Application filed November 16, 1904. Serial No. 232,980.

*To all whom it may concern:*

Be it known that we, FRED H. DANIELS, AXEL F. BACKLIN, and IDOFF EKLUND, all citizens of the United States, and residing in Worcester, county of Worcester, State of Massachusetts, have invented certain new and useful Improvements in Coke-Drawing Apparatus; and we do hereby declare the following to be a full, clear, and exact description of the invention, such as will enable others skilled in the art to which it appertains to make and use the same.

The object of the invention is to provide a coke drawing apparatus where all the parts are more easily and quickly controlled by the operator than has heretofore been possible, and especially one where there is more flexibility of action to the rake beam, its operating mechanism, and the fork or rake carried by the beam.

The invention comprises a car running on a track in front of the battery or bank of ovens, and carrying upon itself a turn-table on which are mounted the rake beam and mechanism for tilting the beam and projecting and withdrawing it, as well as the mechanism for operating the rake at the end of the beam. In front of the turn-table and between it and the ovens a conveyer runs so as to receive the coke that is drawn out of the ovens by the rake and carry it sidewise to another conveyer running at right angles thereto and which distributes the material to a car or other receptacle or deposits it in piles on the ground. The distributing conveyer is arranged to rise and fall at its delivery end, and separate motors are provided for driving the conveyers. The motor which drives the transverse conveyer is geared up to the wheels so as to propel the car along the track, and the motor which drives the distributing conveyer is geared up to a winding drum by means of which the delivery end of this conveyer is raised and lowered. The motor which moves the rake beam longitudinally is also geared up so as to rotate the turn-table, certain of the motors are preferably electric and all are under control by the operator from his position on the turn-table.

It has already been proposed to mount the rake beam on a turn-table and to employ power-actuated mechanism for tilting and reciprocating it. So far as we know, however, the mechanism for operating the beam has consisted of positively acting, unyielding trains of gears, levers and racks that permit of no yield or give in the movement of the parts, and limit the speed of the tilting and sliding movements within too narrow limits. It has also been proposed to use folding rakes or forks on the end of the beam entering the ovens, but the construction of the rakes and the method and means for operating them has not been such as to permit access to all parts of the oven, or conducive to getting an efficient hold on the mass of coke contained therein.

The present invention aims especially to improve the construction of the rake, and the means for operating it and the beam, and it is characteristic of the improvement that the tilting of the beam and the movements of the rake are obtained by the direct application to each part of pressure derived preferably from compressed air or other elastic motive power permitting similar flexibility and rapidity of action.

The invention is illustrated in the accompanying drawings where

Figure 1 is a plan view with certain parts omitted. Fig. 2 is a side elevation showing the apparatus in action. Fig. 3 in an enlarged plan of the turn-table, with some of the gearing partly in section. Fig. 4 is a partly sectional side elevation of the rake operating mechanism. Fig. 5 is a sectional view of the same mechanism taken centrally through the shaft on which the rake beam oscillates. Fig. 6 is a detail section of the gearing for raising and lowering the distributing elevator. Fig. 7 is an enlarged side elevation of the same. Fig. 8 is a side elevation of the apparatus with the rake beam omitted. Fig. 9 is a plan view of so much of the apparatus as is shown in Fig. 8. Fig. 10 is a cross section of the distributing conveyer. Fig. 11 is a diagrammatic view of the pneumatic system for tilting the rake beam and operating the pivoted rake. Fig. 12 is a sectional view of the dash pot. Figs. 13 and 14 are respectively a plan and elevation of the four-way valve operating mechanism. Fig. 15 is an enlarged detail of the pneumatic cylinder and connections for operating the rake at the front end of the beam. Fig. 16 is a detail view of the rake showing it in its projected position and Fig. 17 is a view of a detail of the conveyer.

Referring to these views 1, 1, denotes the rectangular framing of a car that is mounted on wheels $a$, $a$, and runs upon the rails $b$, $b$, of a track laid in front of and extending along a battery of coke ovens $c$. On supplemental beams $1^a$, $1^a$ extending across the lower part of the car framing there is a small stand or platform 36, and a circular turn-table 2 whose top is flush with the floor of the car is revolubly mounted on rollers 3, 3, journaled at diametrically opposite points in the sills 1, 1. The central portion of the turn-table is depressed as shown in Fig. 5, and a hollow stud or post 37 rising from the stand 36 forms a center bearing for the table to turn on. A cap plate 38 that is held on the post by a nut $38^a$ is provided to hold the table down, and anti-friction balls or rollers $37^a$ are located between the cap plate and the central hub of the table to cause the table to turn easily.

All the necessary machinery for operating the rake is carried by the turn-table, and a worm gear 35 which is secured in fixed position to the stand 36 serves to revolve the table through the intermediacy of a train of gearing that will be described later on.

The car also carries a reversible electric motor 47 for driving it along the track. It is preferably located near one end of the platform, and its shaft has a pinion 48 meshing with a large gear $48^a$ on the shaft of which there is a pinion 49. The pinion 49 drives a gear $49^a$ on a short shaft having a pinion (not shown) at its other end. The shaft of the gear $49^a$ is parallel with the car axle and a short shaft $50^a$ having bevel gears at its ends (shown in dotted lines in Fig. 1) is interposed between bevel gears on the axle and pinion shaft, respectively, so that the axle and car may be driven in either direction according to the direction of rotation of the motor.

The cross sills of the car at opposite ends are extended as shown at $1^b$, $1^b$, in Fig. 1 so as to span the space between the body of the car and the ovens, and on this extension of the car body a conveyer 61 is mounted and travels constantly in one direction so as to receive the coke as it is drawn out of the ovens and carry and deliver it to a cross conveyer at the end of the car opposite the motor 47 already described. The particular construction of the conveyer 61 is not important and it is not illustrated in detail. The means for driving it, however, form part of the invention and are as follows: A one-way electric motor 54 is mounted at the end of the car near the cross conveyer and has its shaft $54^a$ extending nearly the width of the car and provided with a pinion 55. This pinion drives a gear $55^a$ on a short shaft 56 having a bevel pinion $56^b$ at one end and a spur pinion $56^a$ at the other. The spur pinion engages a wheel $64^a$ and drives its shaft 64, and on the other end of the shaft a pinion 70 drives a shaft 65 through its gear 67, all as shown in Figs. 6 and 7. The shaft 65 has a sprocket 66 around which a chain runs to drive the conveyer shaft $66^a$ at one end of the car and operate the conveyer chains so as to carry the material constantly toward the other conveyer that will be presently described.

The turn-table is rotated in either direction by a reversible electric motor 4 that is mounted on the table and turns with it. The gearing for rotating the table is as follows: The motor shaft 5 has a pinion 30 which drives a combined gear and friction clutch $30^a$ which is keyed on a short shaft 31. The other part 38 of the clutch is splined on a sleeve which revolves on the shaft 31 and has at its other end a pinion 32, which drives a gear $32^a$ on another shaft $31^a$ having a pinion 33. The pinion 33 meshes with a gear $33^a$ on the shaft of the worm 34 which is mounted in bearings $32^b$, $32^b$, secured to the under side of the turn-table. The object of this particular gear train is to reduce the speed of the motor, and the clutch-half 38 connects and disconnects the shaft 31 from its driver (the pinion 30) so as to stop and start the worm, which it will be understood travels around with the table in mesh with the fixed worm gear 35.

The rake for drawing the coke consists of a trough like beam 15 that is slidingly mounted in a rocking cross head or cradle 20, anti-friction rollers 22, 22, being provided at each end of the cradle above and below the beam to make the latter work easily. The cradle is pivoted midway of its length on gudgeons $20^b$, $20^b$ in axial alinement with a shaft $12^a$ that is journaled in uprights $20^a$, $20^a$ rising from the turn-table. The shaft $12^a$ has a pinion 13 and there is a rack 14 on the under side of the rake beam which meshes with it so that the beam is moved longitudinally in or out by the rotation of the shaft.

The means for sliding and rocking the rake beam, as well as that for operating the fork 23 at the outer end of the beam, are carried by the turn-table, and consist as follows: In the uprights $20^a$, $20^a$, below the shaft $12^a$ a shaft 9 is mounted, and this shaft drives the shaft $12^a$ through the intermeshing gears 11 and 12. The shaft 9 also carries a bevel gear $9^a$ which is driven by a pinion $7^a$ on a short sleeve having splined on it a sliding clutch-half $8^a$. The sleeve 7 is carried by a shaft and is rotated from the motor 4 already described by an idle gear 6 which meshes with a pinion $5^a$ on the end of the motor shaft and in turn drives a combined gear and clutch-half 8 that is keyed on the shaft of the sleeve 7. It will thus be understood that the rake-beam may be slid longitudinally in either direction, depending on the direction of rotation of the motor 4, or that its operating mechanism may be thrown out of gear altogether with the shaft of the motor.

The rake beam is tilted vertically by rocking the cradle 20 on the shaft $12^a$. Heretofore this has been done by mechanical arrangements of gears and levers, but the present invention contemplates a more flexible method of effecting this tilting motion, as well as for operating the fork at the end of the rake, the object being to make both these motions approximate as nearly as possible the action of drawing the coke by hand. To this end an air cylinder 44 is mounted on the turn-table at the rear of the cradle, and the rod 45 of its piston is pivotally connected to the cradle as best shown in Fig. 4. The cylinder 44 has connection at each end with an air reservoir 41 through pipes 91, 91, that are controlled by a four-way valve $p$ so that by properly manipulating the valve the piston may be driven up or down to raise or lower the rear end of the cradle as may be desired to elevate or depress the fork-carrying end of the rake beam. The reservoir 41 is connected to an air compressor 40, and the compressor is preferably provided with an automatic governor (not shown) to maintain a uniform, predetermined, pressure under storage in the reservoir for the tilting of the rake beam and the operation of the rake as will presently be described.

In order to cushion the rocking movement of the cradle 20 and the parts carried thereby, and also to prevent injury to the machinery actuating the rake beam and its connected parts, an oil dash pot 46 is carried by the turn-table in proximity to the air cylinder 44, and has the rod $6^a$ of its piston $b$ connected to the cradle near its rear end. The cylinder of the dash pot is mounted on trunnions $b'$ as is also that of the air cylinder 44, in order that they may tilt to conform to the rocking of the rake beam, and opposite ends of the dash pot, above and below its piston, are connected by a by-pass $c'$ provided with a valve $d$. By means of this valve the speed of the rocking movement of the rake beam and the motion of the rake can be controlled, and by shutting off the valve altogether the beam can be stopped and held in any position regardless of the action of the air cylinder 44.

The particular construction of the dash pot is not important, but as shown herein it has a lining $e$ which is provided at opposite ends with elongated ports $f$, and the cylinder ends have annular spaces $g$ that connect freely with the by-pass. As the piston $b$ approaches either end of the cylinder the ports are gradually choked and the volume of liquid passing is gradually diminished until the ports are entirely closed when movement of the rake beam ceases.

At its outer end the rake beam is provided with a pivoted rake or fork 23 which is operated from a pressure cylinder 16 carried by the rake beam at its rear end through the intermediacy of a piston rod 28 that is connected to a cross head 29. The cross head has a pitman 24 extending to the outer end of the beam where it is pivotally connected to a bell crank 26 mounted in ears on the end of the beam, and the heel of the rake 23 is connected to the other arm of the bell crank. At an intermediate point, the rake is also connected to the pivot of the bell crank by a slotted link 25, so that as the piston rod 28 is operated the rake is thrown from the position shown in Fig. 2 to that shown in Fig. 16.

Each end of the cylinder 16 is provided with ports or openings that are connected by pipes $h$, $h$, forming by-passes, and the cylinder communicates with air pipes 19, 19 by means of flexible hose pipes 17, 17. The pipes 19, 19, extend through a tube $i$ on the top of the cradle 20 and lead to the storage reservoir 41 through a four-way valve similar to the one controlling the passage of air to the cylinder 44 through the pipes 91. Each by-pass $h$ is provided with a check valve as shown in Fig. 15, and the object of the double ports and check valves is to form a sort of dash pot at each end of the cylinder to ease the stroke of the piston at each end of the cylinder. The by-passes and check valves also serve to supply air for the return stroke when the inlet ports are closed by the piston, the check valves being arranged to allow air to blow into but not out from the cylinder.

As before explained, the air pressure is supplied to and exhausted from the cylinders 16 and 44 through the pipes 19, 19 and 91, 91, respectively under the control of the four-way valves $p$, $p^\times$. In the operation of the apparatus the movement of the rake has a definite relation to those of the rake beam, and it is desirable that the four-way valves should be mechanically connected so as to operate simultaneously to preserve this relation. For this purpose, the stem of each valve has a pinion $p^2$ and the two pinions are intergeared and operated by a hand crank, as shown in Figs. 13 and 14. With this arrangement the operation is always as indicated by the arrows in Fig. 11, the piston rod 45 being moved upward to bring the front end of the rake beam down upon the mass of coke in the oven, and the rod 28 being drawn back to cause the rake 23 to enter the coke and be held in position to draw it when the rake beam is retracted.

The distributing conveyer 62 is pivoted to one of the rear corners of the car on the bar $60^a$. It consists of a trough having sides $k$ and a slatted bottom $l$ as best shown in Fig.

10. To the outer end of the trough a chute 62ᵃ is pivoted at 100 so as to swing laterally and upon the axle 101 to swing vertically (see Fig. 17), and the entire conveyer is adapted to be raised and lowered by the motor 54 as follows: The shaft 64, which is driven from the motor shaft 54ᵃ, as already described, has a pinion 70, and a shaft 69 lying parallel with and near the shaft 64 has a similar pinion 71. These two shafts have an equal but opposite motion imparted to them from the motor shaft by gearing already described, and the pinions 70 and 71, respectively, engage gears 76ᵇ and 76ᵃ that are loose on opposite ends of an intermediate parallel shaft 76 carrying a fixed worm 77. Each of the gears 76ᵃ and 76ᵇ has a long hub, and on these hubs there are splined clutch-halves 74, 74 having teeth that are adapted to interlock with similar teeth on the ends of the worm. Arranged as thus described, it will be understood that the clutch-halves 74, 74, are constantly revolved in opposite directions, and that the worm may be driven in either direction by being clutched to one or the other of these halves 74.

The conveyer 62 is supported by ropes 80, 80 that are connected to the outer end of the trough and have their other ends made fast to a drum 79 that is journaled in an A-frame 81, 81, and has a worm gear 78 on its shaft. This gear meshes with the worm 77, and the ropes so are wound or unwound from the drum according as the worm is rotated, and the conveyer and trough are thus raised and lowered by power that is under the operator's control, a suitable reverse clutch shipping arrangement being located at any convenient point. On their way from the winding drum 79, the ropes 80 pass over an idle drum 89, and the conveyer trough is braced laterally by the diagonal strut $m$.

The construction of the moving part of the conveyer is not of importance, and is not illustrated in detail further than in Fig. 10 where it will be seen that it consists of two chains $n$, $n$ running on ledges $o$, $o$, on the sides of the trough and connected together by blades or flights as shown. The conveyer is thus supported somewhat above the slotted bottom of the trough and pushes the coke outward along the slats and delivers it on to the chute 62ᵃ.

The conveyer chains $n$, $n$ travel around sprockets on an idle shaft $q$ shown in dotted lines in Figs. 1 and 9. Thence they travel in a nearly horizontal direction along the end of the car to the conveyer trough, and are operated from the shaft 56 already described by the following gearing: A bevel pinion 56ᵇ on the outer end of the shaft gears with a similar pinion on a shaft 57 having a spur gear 57ᵃ. This gear drives a larger gear $s$ on a short shaft (not shown) below it, and on this shaft is a pinion which drives the wheel $t$ that is fast on the shaft 60 of the conveyer. This shaft has a sprocket wheel 59, and the shaft around which the conveyer runs at the outer end of the trough has a similar sprocket wheel 22. The outer shaft constitutes the drum for the conveyer chain, and the sprocket 22 is driven by a chain 22ᵃ from the sprocket 59. In this way the upper ply of the conveyer chain is kept taut in the operation of the conveyer.

The construction being as thus described, the operation is briefly as follows: A stand for the operator will be located at some convenient point on the car, and all the operative parts of the apparatus will be under control from this stand, a suitable controller for the electric motors being provided. The feed wires supplying current to the motors come up from below the turn-table through the hollow stud. The conveyers 61 and 62 run continuously, and the material that is raked from the ovens is carried first laterally and then rearward and delivered where desired. The car being in front of a given oven, the four-way valves are operated so as to give the rake beam the proper inclination, and to project the rake with its prongs outreaching as shown in Fig. 16. The beam 15 is then thrust forward until the rake has reached the proper point in the oven, when the cylinders 16 and 44 are operated so as to bring down the rake on the coke with the prongs or fork in proper position to enter the mass of coke. The rake beam is then withdrawn and the coke pulled out on to the transverse conveyer, the flexible hose 17 permitting the longitudinal movement of the beam without disconnection of the cylinder 16 from the pipes 19 on the cradle.

The horizontal and vertical movements of the rake are important, inasmuch as they make it possible to reach those parts of the coke bed that are nearest the oven walls and which now have to be drawn by hand, and the horizontally projected position is especially valuable in permitting the rake to enter the oven on top of the coke bed.

The peculiar construction of the links and levers for operating the rake permit of the latter being thrown quickly into its vertical position and at the same time allow a little leeway without operating the air cylinders when the rake strikes the wall of the oven, and the fact that these motions are effected pneumatically enables the machine to perform the operation of withdrawing the coke without any undue strain on the machinery, and the motions approach very nearly those of hand drawing.

It is to be noted of the apparatus generally that the conveyers, the turn-table, the rake and other parts are operatable from separate motors instead of one large engine being employed with cumbersome trains of gears, clutches, &c. These motors are preferably electric, and are all under easy control from the operator's position on the turn-table, the result being that the parts are more easily and quickly operated than has heretofore been possible in this class of machinery.

In respect of the rake beam and the rake, it is to be particularly noted that the operation of the parts by compressed air or other source of pressure enables all the movements of the heavy beam to be effected with greater rapidity than has heretofore been obtainable with the positively operated gear trains above referred to. Moreover, there is less weight and machinery comprised in the operative mechanism, and the tilting and sliding movements are obtained without that jar and racking which is incidental to the employment of positive gears.

When the rake beam has been projected forward so that the rake reaches the desired point in the oven, the rake is turned down into operative position and the employment of a pressure cylinder and the direct connection of the rake beam to the piston thereof, makes it possible for the operator to dig the rake into the coke with a number of rapid strokes with a sort of pecking action closely resembling the operation by hand, and the employment of the dash pot with its adjustable by-pass puts the operation of the beam still further under the operator's control.

The manner of mounting the rake on the beam is an especially important feature of the invention, and it is to be noted that when the point of the rake is extended forward in the act of entering the oven, the rake and all its parts lie low down on the beam and project straight out therefrom, the slot in the link 25 permitting the raising of the point of the rake without unduly lifting the body portion and without requiring an excessive elevation of the beam itself.

The slotted link connection 25 between the rake and the beam is also an important feature, inasmuch as it imparts a certain flexibility of action to the rake in the operation of finding cracks or cleavages in the coke or in the act of digging its own way into the mass. It also allows considerable leeway in the operation of the air cylinders 16 and 44, the slot providing for a limited amount of forward movement of the beam while the rake is engaged with the coke, and also providing a positive stop for the rake when the beam is operated to withdraw the mass of coke.

We believe ourselves to be the first to provide a tiltable rake beam for a coke drawing apparatus with a rake of this description, and the provision of means for manipulating it in advance of the drawing action as above described, and for gradually and certainly forcing or digging it into the coke with a hammer-like action so as to secure a proper drawing hold thereon, is particularly advantageous in this class of machines.

Although we have here shown only compressed air for operating the pistons of cylinders 16 and 44, it is to be understood that any other elastic gaseous medium might be employed. The construction of the rake may also be varied, and we do not intend to be limited to the means for connecting and operating it.

Having thus described our invention, what we claim is:—

1. In a coke drawing apparatus, the combination of a vertically rocking and horizontally sliding rake beam, a rake pivoted at the outer end of the beam, and pressure operated cylinders and pistons for rocking the beam and operating the rake at the end thereof.

2. In a coke drawing apparatus, the combination of a vertically rocking and horizontally sliding rake beam, a pressure operated cylinder and piston for rocking the beam and a dash pot connected to the beam and arranged to cushion its rocking motion.

3. In a coke drawing apparatus, the combination of a car, a turn-table carried thereby, a stationary worm gear fixed on the car, a worm carried by and traveling with the table and meshing with the gear, a motor carried by the turn-table, and a train of gears connecting the motor with the worm.

4. In a coke drawing apparatus, the combination of a car, a turn-table mounted thereon, a stationary worm gear fixed on the car, a traveling worm carried by the table, a horizontally sliding rake beam mounted on the table, gear trains for sliding the beam and rotating the table, and a motor carried by the table and operating both trains.

5. In a coke drawing apparatus, the combination of a rake beam, a rake connected at its heel end to a movable pivot at the outer end of the beam, a connection between the rake and a fixed pivot on the beam between the heel and point of the rake and a pressure operated cylinder and piston for operating the rake.

6. In a coke drawing apparatus, the combination of a rake beam, a rake connected to the outer end thereof by a pivoted link, an operating rod connected to the heel of the rake, the link having a slotted or loose connection with the rake to permit the latter to be extended ahead of the beam without raising its point above the beam and a pressure operated cylinder and piston for operating the rake.

7. In a coke drawing apparatus, the combination of a rake beam, a rake pivotally mounted at the outer end of the beam, means for extending the rake forward in line with the beam preliminary to the raking operation, a pressure operated cylinder and piston for turning the rake down into operative position, a pressure operated cylinder and piston for rocking the beam vertically so as to cause the rake to take proper hold of the coke, and means for withdrawing the beam and rake from the oven.

8. In a coke drawing apparatus, the combination of a rake beam, a bell-crank lever at the outer end of the beam, a rake pivoted at its heel to one arm of the lever, an operating pitman pivotally connected to the other arm of the lever and a pressure operated cylinder and piston for operating the rake.

9. In a coke drawing apparatus, the combination of a rake beam, a bell-crank lever 26 at the outer end thereof, a rake pivoted at its heel to one arm of the lever, a slotted link 25 connecting the rake to the beam below its heel pivot, an operating pitman 24 pivotally connected to the other arm of the lever and a pressure operated cylinder and piston connected to the pitman 24.

10. In a coke drawing apparatus, the combination of a rocking rake beam, a pressure cylinder mounted on the rear end of the beam, a rake carried at the front end of the beam and movable with relation thereto, operating connections from the piston of the cylinder to the rake and a pressure cylinder and piston for rocking the beam.

11. In a coke drawing apparatus, the combination of a cradle pivotally mounted to rock vertically, a rake beam sliding in the cradle, pipes mounted on the cradle, a rake carried on the front end of the beam, a pressure cylinder mounted on the rear end of the beam and having its piston connected to the rake, and flexible hose pipes connecting the cylinder with the pipes on the cradle.

12. In a coke drawing apparatus, the combination of an air compressor and storage reservoir, a cradle, a vertically rocking and horizontally sliding rake beam, having a rake pivoted at its outer end, air cylinders having their pistons connected respectively to the cradle and rake, and pipe connections between said cylinders and the storage reservoir.

13. In a coke drawing apparatus, the combination of an air compressor and storage reservoir, a cradle, a vertically rocking and horizontally sliding rake beam having a rake pivoted at its outer end, air cylinders having their pistons connected respectively to the cradle and rake, pipe connections between said cylinders and the storage reservoir, and four-way valves controlling said pipes, the valves being connected together for concurrent operation.

14. In a coke drawing apparatus, the combination of a rake beam, a rake pivoted at its front end, and a rake-operating pressure cylinder carried by the beam, said cylinder having double ports at each end connected together by by-pass pipes having check valves permitting air to enter the cylinder but not to leave it.

15. In a coke drawing apparatus, the combination of a car, a conveyer trough pivoted on the car, suspending ropes passing from the outer end of the trough to a winding drum on the car, a worm-wheel on the drum shaft, a worm meshing therewith, a non-reversible motor, clutch mechanism interposed between the motor and the worm for reversing the motion of the drum, a rake for withdrawing the coke mounted upon said car and means for conveying the withdrawn coke to said trough.

16. In a coke drawing apparatus, the combination of a car, a conveyer trough pivoted on the car, suspending ropes passing from the outer end of the trough to a winding drum 79 having a worm gear 78, a motor 54, shafts 64 and 69 driven in opposite directions by the motor shaft, a worm 77 meshing with the gear 78, clutch-halves 74, 74 driven in opposite directions by the shafts 64 and 69 and adapted to be clutched to the worm to drive it in either direction, a rake upon said car for withdrawing the coke and means for conveying the withdrawn coke to the trough.

17. In a coke drawing apparatus, the combination of a car, a turn-table mounted centrally thereon, a laterally moving conveyer on the car between the turn-table and the ovens, a distributing conveyer at one end of the car receiving material from the cross conveyer and delivering it in rear of the car, motors on the car for operating the conveyers, a vertically rocking and horizontally sliding beam on the turn-table having a rake pivoted thereto, a motor on the table for turning it and operating the rake beam, and pressure cylinders on the table for rocking the beam and projecting and retracting the rake.

18. In a coke drawing apparatus, the combination of a turn-table, a cradle 20 pivoted on the turn-table co-axially with a shaft $12^a$ mounted in standards $20^a$, $20^a$, a rake beam 15 having a rack 14 meshing with a gear 13 on the shaft, a pressure cylinder and piston 44, 45, for rocking the cradle, an electric motor 4 also mounted on the turn-table for sliding the rake beam, and a gear train between the motor and the shaft $12^a$ for driving it in either direction.

19. In a coke drawing apparatus, the combination of a car cut away in the center to receive a turn-table, a platform 36 having a central post 37 forming a pivot or journal for the table, a worm gear fixed on the platform, a worm on the under side of the table meshing with the gear, a motor on the table, and a gear train between the motor and the worm under the table.

20. In a coke drawing apparatus, the combination with a rake for withdrawing the coke of a conveyer trough pivoted to rise and fall at its outer end, a chute pivoted to the trough to turn laterally and vertically and means for conveying the withdrawn coke to said trough.

21. In a coke drawing apparatus, the combination with a car of a rocking rake beam, a rake pivotally mounted at the outer end of the beam, a pressure operated cylinder and piston for extending the rake forward in line with the beam preliminary to the raking operation, means for turning the rake down into operative position, a pressure operated cylinder and piston for rocking the beam vertically so as to cause the rake to take proper hold of the coke, and means for sliding the beam with relation to the car for withdrawing the beam and rake from the oven.

In testimony whereof we affix our signatures, in presence of two witnesses.

FRED H. DANIELS.
    AXEL F. BACKLIN.
    IDOFF EKLUND.

Witnesses:
 G. LAMPRON,
 THOS. MACDUFF.